(12) United States Patent
Collins

(10) Patent No.: US 8,295,617 B2
(45) Date of Patent: Oct. 23, 2012

(54) SYSTEMS AND METHODS FOR ENHANCED IMAGE ENCODING

(75) Inventor: Henry Collins, High Wycombe (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 736 days.

(21) Appl. No.: 12/468,424

(22) Filed: May 19, 2009

(65) Prior Publication Data

US 2009/0285496 A1    Nov. 19, 2009

Related U.S. Application Data

(60) Provisional application No. 61/054,443, filed on May 19, 2008.

(51) Int. Cl.
*G06K 9/36* (2006.01)
*G06K 9/46* (2006.01)

(52) U.S. Cl. .......................................................... 382/232
(58) Field of Classification Search .................... None
See application file for complete search history.

(56) References Cited

U.S. PATENT DOCUMENTS

| | | | | |
|---|---|---|---|---|
| 5,822,465 | A * | 10/1998 | Normile et al. | 382/253 |
| 6,671,418 | B2 * | 12/2003 | Rengakuji et al. | 382/264 |
| 6,983,020 | B2 * | 1/2006 | Christiansen | 375/240.16 |
| 7,028,025 | B2 * | 4/2006 | Collins | 1/1 |
| 7,127,525 | B2 * | 10/2006 | Coleman et al. | 709/247 |
| 7,171,444 | B2 * | 1/2007 | Deshpande | 709/203 |
| 2005/0238101 | A1 | 10/2005 | Schu et al. | |
| 2008/0115073 | A1 | 5/2008 | Erickson et al. | |

FOREIGN PATENT DOCUMENTS

| | | |
|---|---|---|
| GB | 2 318 956 | 5/1998 |
| WO | WO-99/62179 | 12/1999 |
| WO | WO-02/093934 | 11/2002 |
| WO | WO-03/084070 | 10/2003 |

OTHER PUBLICATIONS

International Report on Patentability on PCT/US2009/044473 dated Dec. 2, 2010.

(Continued)

*Primary Examiner* — Li Liu

(74) *Attorney, Agent, or Firm* — Foley & Lardner LLP; John D. Lanza

(57) ABSTRACT

An encoder executing on a first computing machine can receive image data generated by applications executing on the first computing machine. This encoder can divide at least a first image into at least two overlapping image sections according to a grid size and an overlap margin. The encoder computes an index for one overlapping image section, and compares the index with indexes associated with stored image blocks. The results of the comparison can then be used by the encoder to identify at least one stored image that has an index which is substantially the same as the index computed for the at least one overlapping image section. The location of that stored image is associated with a pointer that is further associated with the overlapping image section. The resultant pointer is then transferred to a second computing machine in lieu of the overlapping image section.

20 Claims, 10 Drawing Sheets

OTHER PUBLICATIONS

International Search Report on PCT/US2009/044473 dated Feb. 10, 2010.
Richardson et al: "Virtual Network Computing" IEEE Internet Computing, IEEE Service Center, New York, NY, US, vol 2, No. 1, Jan. 1, 1998, pp. 33-38, XP002142727 ISSN: 1089-7801 p. 35, left-hand column, line 16 right-hand column, paragraph 3.

Taejeong Kim: "Side Match and Overlap Match Vector Quantizers for Images" IEEE Transactions on Image Processing, IEEE Service Center, Piscataway, NJ, US, vol. 1, No. 2, Apr. 1, 1992, pp. 170-185, XP000367544 ISSN: 1057-7149 abstract section IV with figure 4.
Written Opinion on PCT/US2009/044473 dated Nov. 19, 2010.

* cited by examiner

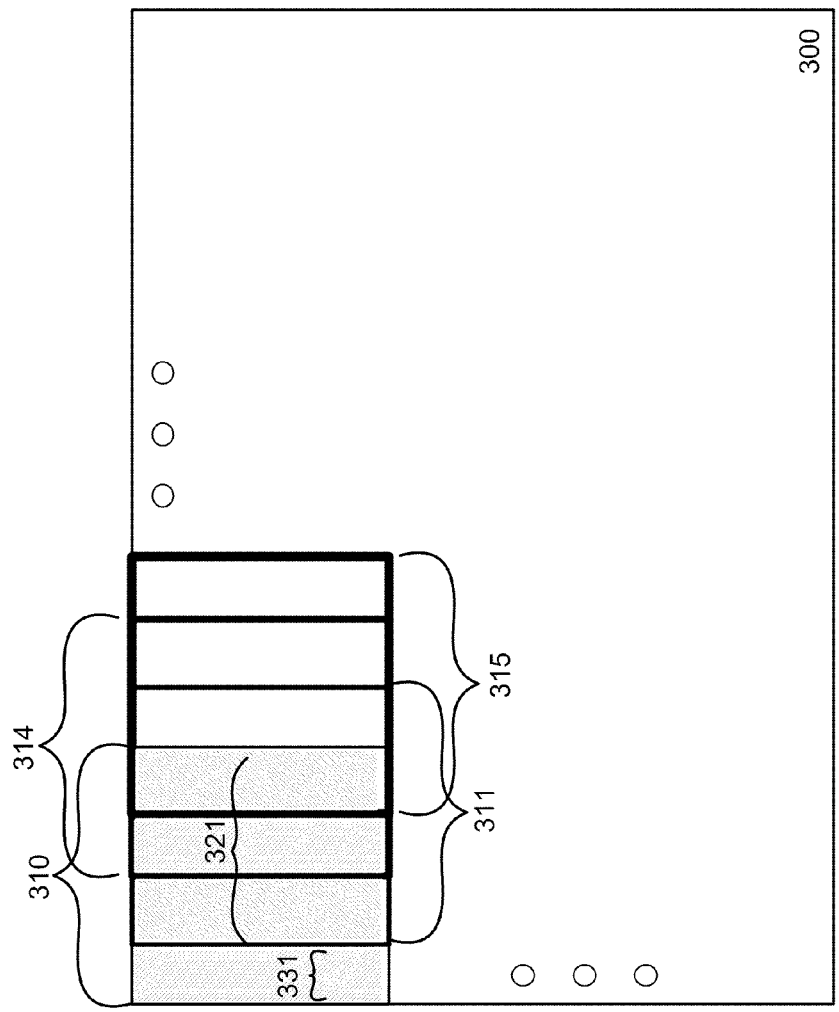

SYSTEMS AND METHODS FOR ENHANCED IMAGE ENCODING

RELATED APPLICATIONS

This U.S. Patent Application claims priority to U.S. Provisional Patent Application Ser. No. 61/054,443, filed on May 19, 2008, the disclosure of which is considered part of the disclosure of this application and is herein incorporated by reference in its entirety.

FIELD OF THE INVENTION

The invention relates generally to encoding techniques. More particularly, one embodiment of the invention provides for efficiently encoding images.

BACKGROUND OF THE INVENTION

Many applications, such as remote access software and screen recording software, encode the contents of a computer screen in real-time. These applications typically encode the graphical contents comprising the displayed image as compactly as possible to account for possible bandwidth and storage constraints. Screen contents can represented as graphical content; multimedia content; update images or a sequence of images. These screen contents can be obtained by an encoder any number of ways including executing an application, or accessing a stored file.

The size of an image or a sequence of images can be substantially reduced by data compression. Some compression techniques include compressing portions of an image while others include compressing entire images. These techniques often do not take into account the repetitive nature of graphics or the likelihood that sections of an image can be common to any number of images. One efficient form of data compression takes advantage of the often repetitive nature of images by identifying blocks of pixels within an image that are the same as stored blocks of pixels. Each section having a matching stored section is tagged with a pointer that points to the stored section. The efficiency of this form of data compression highlights the need for a method and apparatus that quickly detects blocks in an image that also occur verbatim in a reference image, without regard to whether the location of the block is the same in both the reference and new image.

SUMMARY OF THE INVENTION

In its broadest interpretation, the present disclosure describes methods and systems for enhanced image encoding. Often image encoding methods and systems can fail to take advantage of the repetitive nature of image sections within an image. Therefore there is a need for methods and systems that can quickly detect blocks or sections in an image that has pixels which can be coded using a pointer that points to a stored image block occurring verbatim (or probabilistically or approximately) in one of a limited number of reference images. No restrictions are imposed on the reference images other than that they must be shared between the encoder and corresponding decoder. Identical blocks can be detected regardless of their position on the screen, as a result of a block encoding algorithm that utilizes overlapping blocks.

In one aspect, described herein is an embodiment of a method for enhanced image encoding that includes using an encoder to divide an image into at least two overlapping image sections, where the division occurs according to a grid size and an overlap margin. The encoder further computes an index for each overlapping image section, and compares the computed index for each overlapping image section to indexes associated with stored image blocks. Responsive to the comparison, the encoder identifies at least one stored image block having an index substantially similar to an index computed for at least one overlapping image section, and assigns to the at least one overlapping image section a pointer to a storage location of the at least one stored image block. The pointer and those overlapping image sections not assigned to the pointer are then transmitted to a second computing machine.

In some embodiments, the encoder divides the at least one image or image according to an overlap margin having a measurement of at least one pixel. In other embodiments, the encoder divides the at least one image or image according to an overlap margin having a measurement of at least a portion of the image.

Each overlapping image section, in some embodiments, overlaps according to the overlap margin.

The stored image blocks, in some embodiments, are stored in a storage repository on the computing machine. In some embodiments the encoder divides the at least one image or image according to a grid size dictated by either the storage repository or the encoder.

In one embodiment, the encoder transmits the pointer in lieu of the overlapping image section assigned to the pointer. Thus, the pointer is transmitted and the overlapping image section assigned to the pointer is not transmitted. The pointer, in some embodiments, comprises a memory location in the storage repository that corresponds to the memory location of the pointer associated with the stored image block or at least one stored image block. In some embodiments, the index can be either a cyclic redundancy check or a hash value.

In one embodiment, the above described method can be carried out by a computer readable medium that has instructions executable by a computer processor to carry out the method.

In other aspects, described herein is one embodiment of a system for enhanced image encoding. The system comprises a first computing machine executing an application that produces at least one image, and storing in a storage repository on the first computing machine image blocks. The system further comprises a second computing machine communicating with the first computing machine over a communication channel and via a presentation level protocol. An encoder included within the system and executing on the first computing machine can be configured to: divide the at least one image into at least two overlapping image sections according to a grid size and an overlap margin; compute an index for at least one overlapping image section; compare the index for each overlapping image section to indexes associated with the stored image blocks; identify, responsive to the comparison, at least one stored image block having an index substantially similar to the index computed for the at least one overlapping image section; assign to the at least one overlapping image section, a pointer to a storage location of the at least one stored image block; and transmit to the second computing machine the pointer and overlapping image sections not assigned to the pointer.

BRIEF DESCRIPTION OF THE DRAWINGS

The following figures depict certain illustrative embodiments of methods and systems for enhancing image encod

FIG. 3B depicts a block diagram of an embodiment of an image sectioned into overlapping blocks or sections.

FIG. depicts a flow diagram illustrating an embodiment of a method for receiving encoded image sections and pointers.

DETAILED DESCRIPTION OF THE INVENTION

Throughout this description, the terms 'block,' 'tile,' 'slice,' 'section,' 'segment,' 'piece,' 'square,' 'portion,' 'fraction,' 'part,' when used to describe an image or graphic, can refer to any arbitrarily shaped display region or region of pixels. The term 'frame' can refer to any image buffer and/or representation of a screen content, image, and/or display. The terms 'match' or 'matching' and 'correlate' or 'correlating', as in block matching, can include verbatim, literal, probabilistic, statistical, approximate, and/or empirical matching and/or correlating. It is clearly understood that whenever one of these terms is employed (i.e. verbatim) any of the other listed terms may be employed in an embodiment of the invention.

Figure 1A:
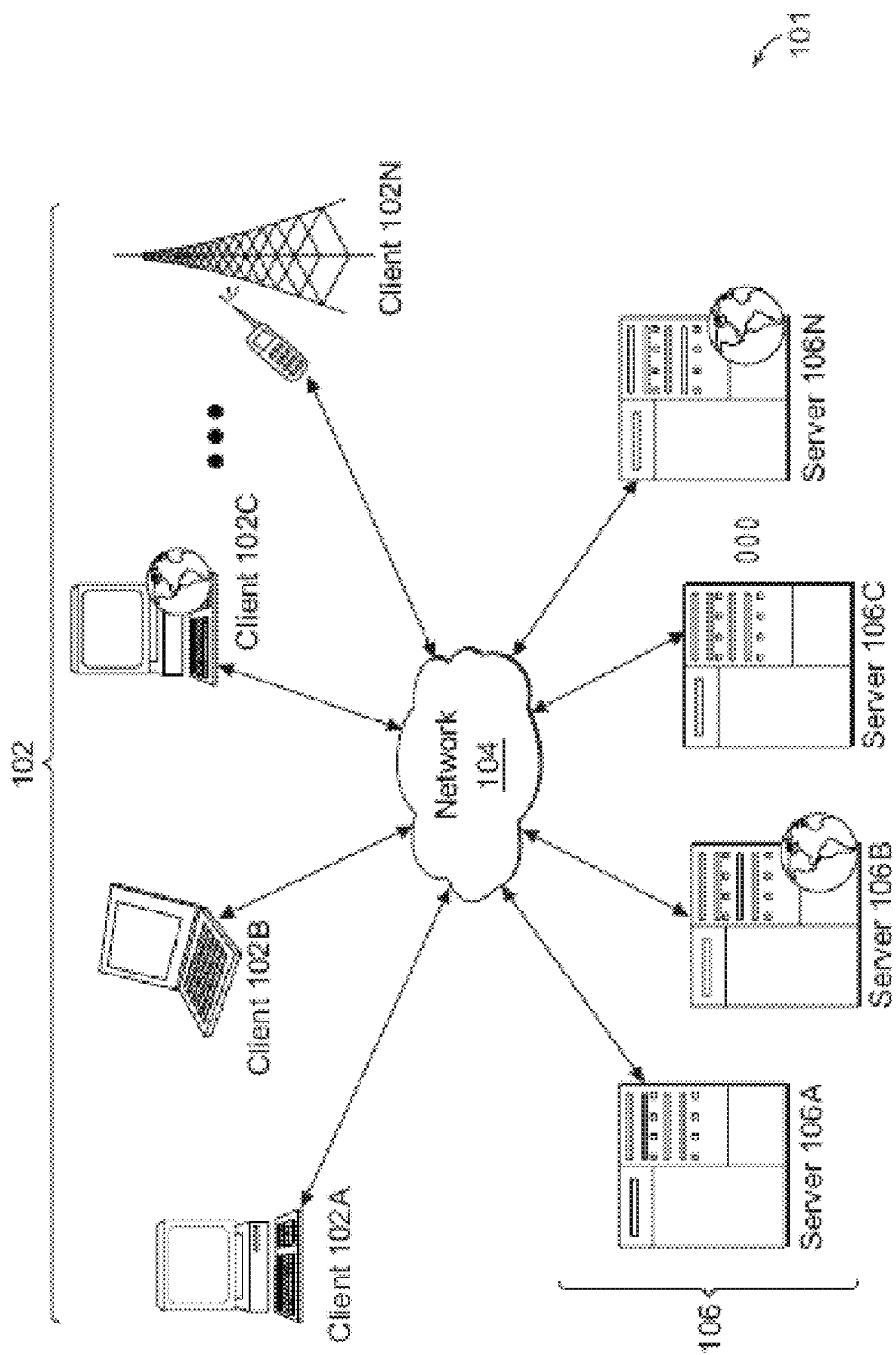
- FIG. 1A depicts a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106 in some embodiments may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
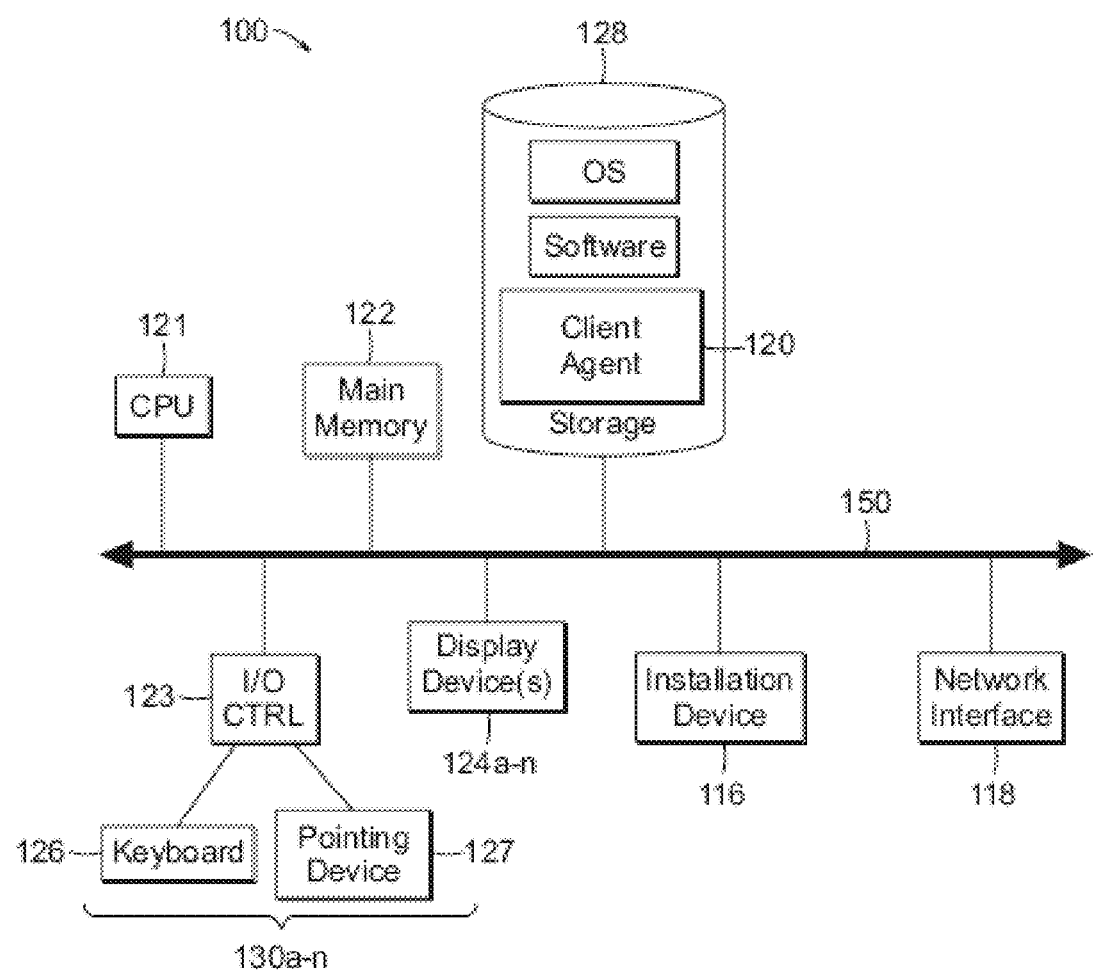
FIGS. 1B and 1C depict block diagrams illustrative of an embodiment of computing machines for practicing the methods and systems described herein.
Figure 1C:
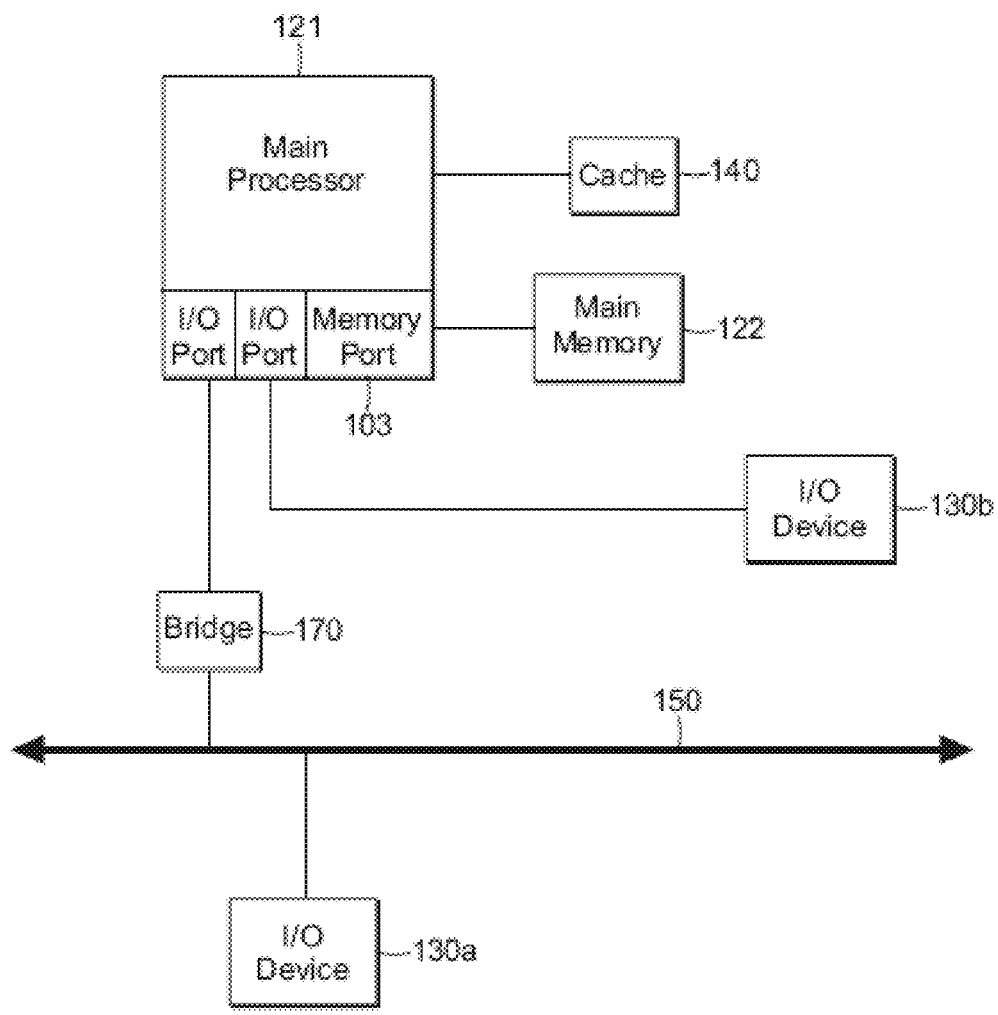

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure IC illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores. In one embodiment the central processing unit 121 can be characterized by one, two or more cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to mulitple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im 1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 1D:
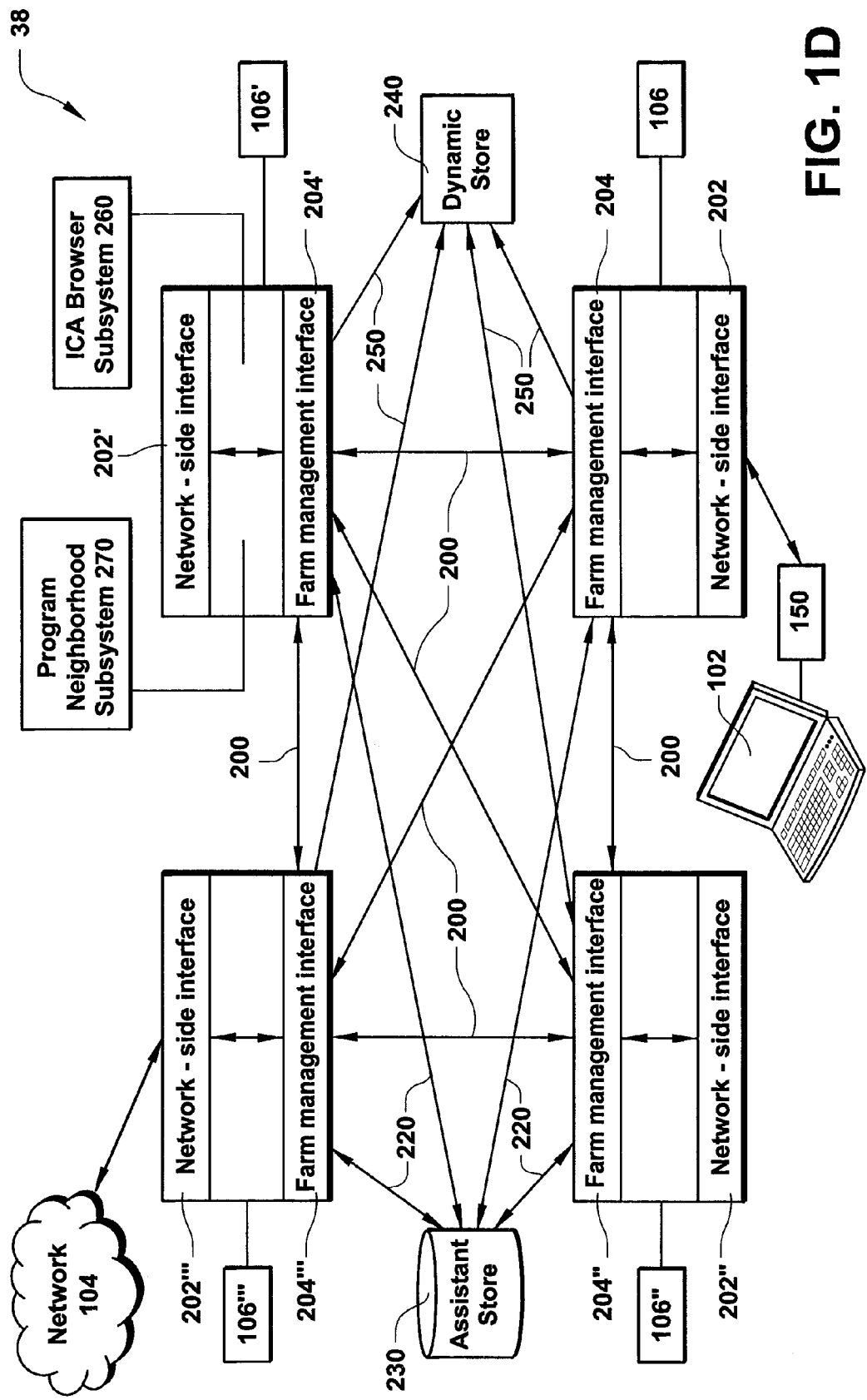
FIG. 1D depicts a block diagram depicting an embodiment of a server farm.

Referring now to FIG. 1D, together the servers 106 comprise a farm 38 or server farm, where each server 106 can include a network-side interface 202 and a farm-side interface 204. The network-side interface 202 can be in communication with one or more clients 102 or a network 104. The network 104 can be a WAN, LAN, or any other embodiment of a network such those networks described above.

Each server 106 has a farm-side interface 204 connected with one or more farm-side interface(s) 204 of other servers 106 in the farm 38. In one embodiment, each farm-side interface 204 is interconnected to other farm-side interfaces 204 such that the servers 106 within the farm 38 may communicate with one another. On each server 106, the farm-side interface 204 communicates with the network-side interface 202. The farm-side interfaces 204 can also communicate (designated by arrows 220) with a persistent store 230 and, in some embodiments, with a dynamic store 240. The combination of servers 106, the persistent store 230, and the dynamic store 240, when provided, are collectively referred to as a farm 38. In some embodiments, a server 106 communicates with the persistent store 230 and other servers 106' communicate with the server 106 to access information stored in the persistent store.

The persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 maintains static data associated with each server 106 in farm 38 and global data used by all servers 106 within the farm 38. In one embodiment, the persistent store 230 may maintain the server data in a Lightweight Directory Access Protocol (LDAP) data model. In other embodiments, the persistent store 230 stores server data in an ODBC-compliant database. For the purposes of this description, the term "static data" refers to data that does not change frequently, i.e., data that changes only on an hourly, daily, or weekly basis, or data that never changes. Each server uses a persistent storage subsystem to read data from and write data to the persistent store 230.

The data stored by the persistent store 230 may be replicated for reliability purposes either physically or logically. For example, physical redundancy may be provided using a set of redundant, mirrored disks, each providing a copy of the data. In other embodiments, the database itself may be replicated using standard database techniques to provide multiple copies of the database. In further embodiments, both physical and logical replication may be used concurrently.

The dynamic store 240 (i.e., the collection of all record tables) can be embodied in various ways. In one embodiment, the dynamic store 240 is centralized; that is, all runtime data are stored in the memory of one server 106 in the farm 38. That server operates as a master network node with which all other servers 106 in the farm 38 communicate when seeking access to that runtime data. In another embodiment, each server 106 in the farm 38 keeps a full copy of the dynamic store 240. Here, each server 106 communicates with every other server 106 to keep its copy of the dynamic store 240 up to date.

In another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to find one or more servers hosting the requested application.

For farms 38 having a large number of servers 106, the network traffic produced by these embodiments can become heavy. One embodiment alleviates heavy network traffic by designating a subset of the servers 106 in a farm 38, typically two or more, as "collector points." Generally, a collector point is a server that collects run-time data. Each collector point stores runtime data collected from certain other servers 106 in the farm 38. Each server 106 in the farm 38 is capable of operating as, and consequently is capable of being designated as, a collector point. In one embodiment, each collector point stores a copy of the entire dynamic store 240. In another embodiment, each collector point stores a portion of the dynamic store 240, i.e., it maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 is distributed amongst two or more servers 106 in the farm 38.

Servers 106 not designated as collector points know the servers 106 in a farm 38 that are designated as collector points. A server 180 not designated as a collector point may communicate with a particular collector point when delivering and requesting runtime data. Consequently, collector points lighten network traffic because each server 106 in the farm 38 communicates with a single collector point server 106, rather than with every other server 106, when seeking to access the runtime data.

Each server 106 can operate as a collector point for more than one type of data. For example, server 106" can operate as a collector point for licensing information and for loading information. In these embodiments, each collector point may amass a different type of run-time data. For example, to illustrate this case, the server 106''' can collect licensing information, while the server 106" collects loading information.

In some embodiments, each collector point stores data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

Browsing enables a client 102 to view farms 38, servers 106, and applications in the farms 38 and to access available information such as sessions throughout the farm 38. Each server 106 includes an ICA browsing subsystem 260 to provide the client 102 with browsing capability. After the client 102 establishes a connection with the ICA browser subsystem 260 of any of the servers 106, that browser subsystem supports a variety of client requests. Such client requests include: (1) enumerating names of servers in the farm, (2) enumerating names of applications published in the farm, (3) resolving a server name and/or application name to a server address that is useful the client 102. The ICA browser subsystem 260 also supports requests made by clients 10 running a program neighborhood application that provides the client 102, upon request, with a view of those applications within the farm 38 for which the user is authorized. The ICA browser subsystem 260 forwards all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem, such as the XML service 516 described in connection with FIG. 6 below, providing program neighborhood functionality on a server 106.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete.

The program neighborhood subsystem 270 then requests the program neighborhood information from the common application subsystem 524 associated with those accounts. The common application subsystem 524 obtains the program neighborhood information from the persistent store 230. On receiving the program neighborhood information, the program neighborhood subsystem 270 formats and returns the program neighborhood information to the client over the program neighborhood virtual channel. Then the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 sends the request to the program neighborhood subsystem 270, which selects a server 106 in the farm 38. Address information associated with the server 106 is identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel is established and remains open for as long as the ICA connection persists. Over this program neighborhood virtual channel, the program neighborhood subsystem 270 pushes program neighborhood information updates to the client 102. To obtain updates, the program neighborhood subsystem 270 subscribes to events from the common application subsystem 524 to allow the program neighborhood subsystem 270 to detect changes to published applications.

Figure 2:
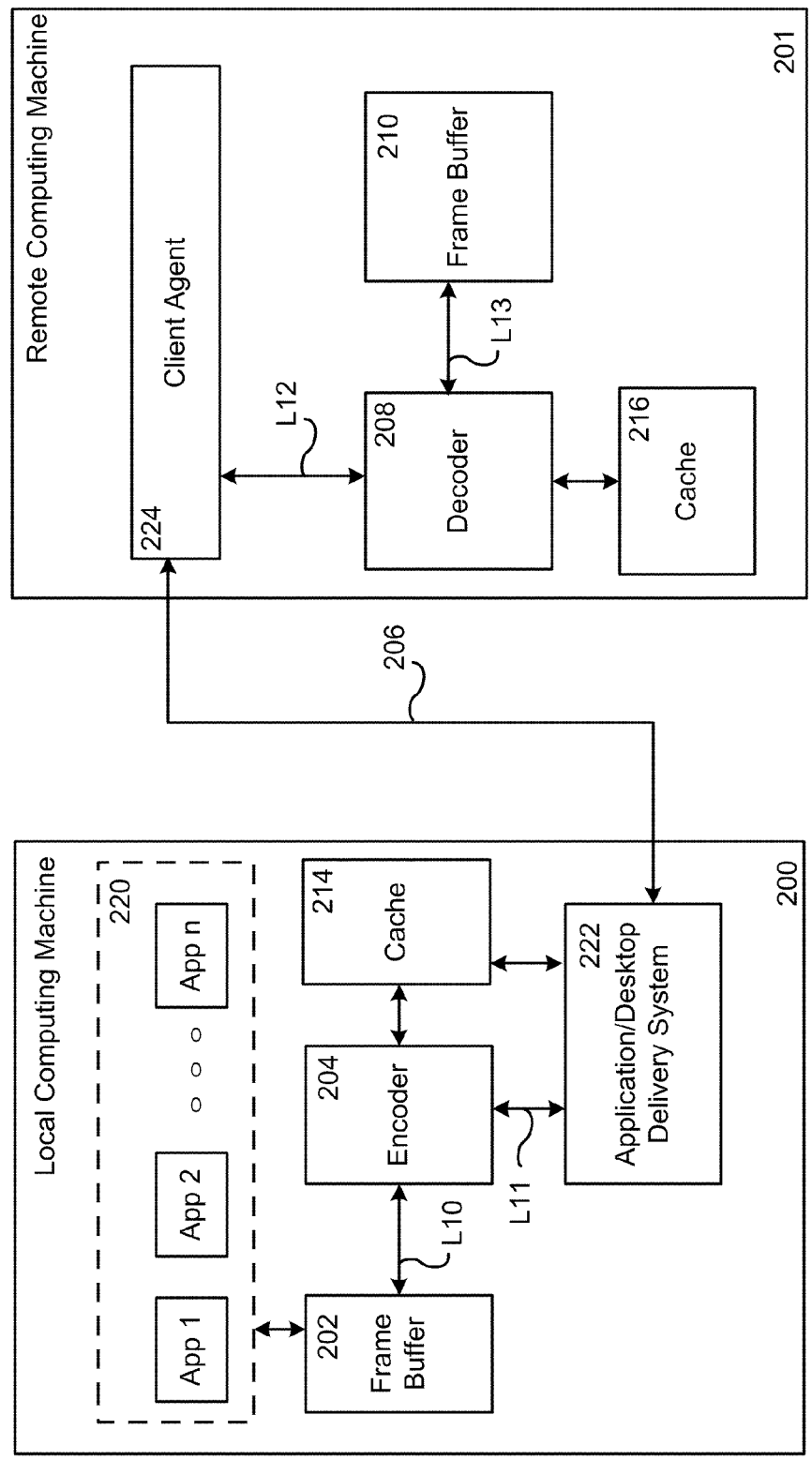
FIG. 2 depicts a block diagram illustrating an embodiment of a system for enhanced image encoding.

Illustrated in FIG. 2 is one embodiment of a system for enhanced graphics encoding. This system can include a local computing machine 200 executing one or more applications 220, where each application can generate graphical display output that can be passed to a frame buffer 202 also executing on the local computing machine 200. The frame buffer 202 can pass the received graphical display output to an encoder 204 executing on the local computing machine 200, where the encoder 204 can further communicate with a cache 214 for additional information, and where both the encoder 204 and the cache 214 can communicate with an application/desktop delivery system 222. Communication between the frame buffer 202 and the encoder 204 can take place over a first connection L10, and communication between the encoder 204 and the delivery system 222 can take place over a second connection L11. The application/desktop delivery system 222 communicates with a remote computing machine 201, and in particular a client agent 224 executing on the remote computing machine 201, over a virtual channel 206 and via a presentation level protocol. The client agent 224 can transmit graphical content over a third connection L12 to a decoder 208 executing on the remote computing machine 201. The decoder 208 can communicate with a frame buffer 210 over a fourth connection L13 and with cache 216 on the remote computing machine 201.

Referring to FIG. 2, and in greater detail, in one embodiment the local computing machine 200 and the remote computing machine 201 can be any of the computing machines described herein. In another embodiment, the local computing machine 200 can be a server or a server farm and the remote computing machine 201 can be a client; while in other embodiments the local computing machine 200 can be a client and the remote computing machine 201 can be a server, a server in a server farm, or a server farm. In still other embodiments, the local computing machine 200 can be a first computing machine and the remote computing machine 201 can be a second computing machine; and in other embodiments, the local computing machine 200 can be a second computing machine and the remote computing machine 201 can be a first computing machine. Still further, the local and remote computing machines 200, 201 can communicate over a virtual channel 206 via a presentation level protocol such as any presentation level protocol described herein. Communication between the local computing machine 200 and the remote computing machine 201 can take place over a network 104 such as any of those networks described herein.

In one embodiment, the local computing machine 200 can execute any number of applications 220. A first application, a second application, a third application, and any 'n' number of applications can execute on the local computing machine 200, where 'n' is a whole number between 1 and any maximum number of applications that a particular computing machine can execute. Collectively, the applications can be referred to as applications 220.

Executing on the local computing machine 200 is a frame buffer 202 communicating with an encoder 204 over a first connection L10. The first connection L10 can be any communicative connection established between the frame buffer 202 and the encoder 204. In some embodiments, the frame buffer 202 can be any buffer able to contain graphics, graphics commands, images or any other graphical or media content. The frame buffer 202 can in some embodiments store the pixel color data for each pixel in a particular image or image portion. This pixel color data can be obtained from an image renderer able to input graphical drawing commands and output an image such as a JPEG, a bitmap, a TIF, a GIF, a PNG, or any other type of media content. While the frame buffer 202 is depicted as communicating only with the applications 220 and the encoder 204, in other embodiments the frame buffer 202 can communicate with any number of system components within the local computing machine 202 such as the cache 214 and the application/desktop delivery system 222.

In some embodiments, the frame buffer 202 receives image data or display graphics from at least one application 220 and stores the image data before passing it along to the encoder 204 over the first communication connection L10. In other embodiments, the frame buffer 202 stores the image data or display graphics in a storage repository such as cache before passing the image data or display graphics to the encoder 204.

The encoder 204 in many embodiments, inputs image data or display graphics and encodes or compresses the data or graphics according to an encoding or compression algorithm. In one embodiment, the encoder 204 encodes the inputted image data or display graphics according to the encoding methods and processes described herein. In other embodiments, the encoder 204 can both encode the image data and compress the image data according to any of the following types of compression: lossless, lossy, Lempel-Ziv, Huffman, Adaptive Huffman, Golomb, or any other type of compression consistent and operative with the encoding methods described herein. In some embodiments, the encoder 204 transmits an encoded and/or compressed image to an application/desktop delivery system 222 for transmission to a remote computing machine 201; however in other embodiments, the encoder 204 transmits an encoded and/or compressed image to a remote computing machine 201 rather than sending the encoded/compressed data to a delivery system 222 for transmission. While FIG. 2 depicts the encoder 204 as communicating with the frame buffer 202, cache 214 and the application/desktop delivery system 222; the encoder 204 can communicate with any number of components on the local computing machine 200 including the applications 220. In some embodiments, the encoder 204 can be included within the frame buffer 202.

Cache 214, 216 can comprise any of the storage repository or memory types described herein. In one embodiment, a set of pre-defined images are stored in cache 214, 216. These pre-defined or pre-stored images can comprise image sections of larger images and in some embodiments can contain an index. The index can be created by calculating a CRC for the stored images or computing a hash or a checksum. In other embodiments, the index can be any identifying element able to distinguish the pixel data within a particular stored image from the pixel data within another stored image.

The application/desktop delivery system 222 can be any application/desktop delivery system 222 described herein and in some embodiments can be CITRIX XenAPP or Xen DESKTOP. The application/desktop delivery system 222 can transmit information over a communication channel 206 to a client agent 224 executing on the remote computing machine 201 via a presentation level protocol such as any of those presentation level protocols described herein. In some embodiments, the presentation level protocol can be: the ICA protocol developed by CITRIX SYSTEMS; the RDP protocol developed by MICROSOFT; or any other presentation level protocol operative with the methods and systems described herein. The application/desktop delivery system 222 can receive data, i.e. image or graphical data, and transmit the data over the communication channel 206 to the client agent 224 on the remote computing machine 201. The client agent 224 can then process the graphical data and transmit it to any number of components within the remote computing machine 201.

In one embodiment, the client agent 224 transmits the received graphical data to a decoder 208 executing on the remote computing machine 201. The decoder 208 can decode and/or decompress image data that was previously encoded and/or compressed by the encoder 204. FIG. 2 depicts the decoder 208 as communicating with the client agent 224, cache 216 and the frame buffer 210, however in some embodiments the decoder 208 can communicate with any components of the remote computing machine 201.

Figure 3A:
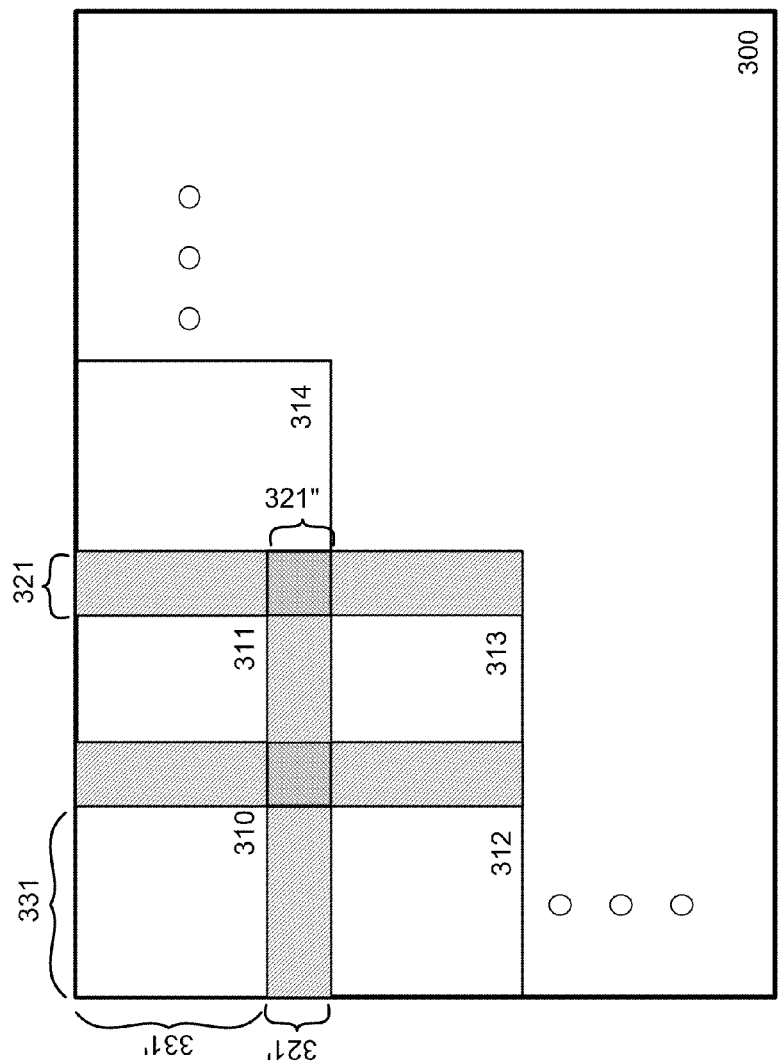
FIG. 3A depicts a block diagram of an embodiment of an image sectioned into overlapping blocks or sections.

Illustrated in FIG. 3A is a block diagram of an embodiment of an image 300 partitioned or divided into overlapping image sections by an encoder or other algorithm able to symbolically divide an image into overlapping image sections by identifying the coordinates of groups of overlapping pixels. The image 300 is divided into a first overlapping section 310, a second overlapping section 311, a third overlapping section 314, a fourth overlapping section 312, a fifth overlapping section 313, and so on. Each overlapping section can be an overlapping image section that overlaps adjacent overlapping image sections by and overlap margin 321, 321', 321". The portion of the overlapping image sections not overlapping an adjacent image section is considered the notional grid size 331, 331'. The image section layout illustrated in FIG. 3A can in some embodiments be the image section layout for storing the image 300 in storage. Thus, when the image 300 is stored in a storage repository, the image 300 may be encoded to create the image layout illustrated in FIG. 3A. In other embodiments, the image layout illustrated in FIG. 3A is the image layout that results from the application of the encoding methods and processes described herein to an image 300.

Referring to FIG. 3A, and in greater detail, in one embodiment the image 300 can be divided into any number of image sections 310, 311, 312, 313, 314. These image sections can be any shape or size, and preferably can span the length and width of the image 300. In one embodiment, the image 300 comprises pixels such that the length of the image 300 can be characterized by the number of pixels spanning the length of the image 300. Similarly, the width of the image 300 can be characterized by the number of pixels spanning the width of the image 300. The total number of pixels included within the image can in some embodiments comprise a value calculated by multiplying the number of pixels spanning the width of the image 300 by the number of pixels spanning the length of the image 300. In some embodiments, the dimensions of the image sections can comprise a diameter, length, width or other measurement substantially smaller than the length or width of the image 300 such that the image section is enclosed within the image 300 boundaries. In some embodiments the image sections may be square and have a pixel perimeter that is a power of two. In other embodiments, the image sections may be rectangular and have a boarder comprising any number of pixels. In some embodiments, the size of each image section may be chosen based on efficiency of an index calculation for each image section. In still other embodiments, the image section size may be chosen based in part on an evaluation of the reduction in transmission and lookup time achieved by segmenting the image 300 into substantially larger image sections, and the impact the larger image sections could have on the likelihood of finding a substantially similar image section in cache. The transmission time and the lookup time described is the time needed to transmit an image section from one computing machine to a second computing machine, and the time needed to search through stored images in cache to identify a stored image substantially similar to a particular image section. The image section size, in still other embodiments, can be chosen such that the image section size is larger than the notional grid size for either a storage algorithm or an encoding algorithm. In this embodiment, ensuring that the image section size is larger than the notational grid size further ensures that each image section will overlap in both algorithms.

In one embodiment, an index can be computed for each image section 310, 311, 312, 313, 314, where the index can be any one of a checksum, a CRC, a hash value or another index. In one embodiment, the index for each image section can be stored in cache 214 so that the indexes may be used later to identify repetitive image sections.

In some embodiments, the image sections may overlay by any margin 321, 321', 321". For example, a first image section 310 overlaps a second image section 312 by a first margin 312'. Similarly, another first image section 311 overlaps another second image section 314 by a second margin 312, and still another first image section 311 overlaps another second image section 313 by a third margin 321''. The notational grid size in each of the previous examples is 331, 331'. The margin 321 can be measured by any number of measurements, including by the number of pixels. Thus, in some embodiments, the image sections may each overlap by 1-10 pixels. In other embodiments, the image sections may overlap by a fixed division of the image section width, length or size. For example, the image sections may overlap by ¼ of the image section size. In still other embodiments, the margin may be a percentage of the image 300 size, i.e. 1/1000 of the image 300 size.

In one embodiment, the notational grid size 331, the margin 321 and the image section size can be measured by any one of the following units of measurement: inches, meters, centimeters, millimeters, nanometers, percentage of the image 300 size, pixels, percentage of an image section size, percentage of the notational grid size, or any other measurement able to be used by the methods and systems described herein.

In one detailed example, the storage algorithm divides the image into 16×16 blocks with a one-pixel overlap margin. This may involve placing a notional 15×15 grid over a bitmap, with origin at its top left corner. With such a grid, the vertical and horizontal grid-lines will intersect at bitmap coordinates: (0, 0) (15, 0) (30, 0) (0, 15) (15, 15), and (30, 15) etc. At the top-left coordinate of each 15×15 grid square, a 32-bit CRC is taken of a 16×16 pixel tile with the same top-left coordinate, i.e. a tile which extends 1 pixel past the right and the bottom edges of the grid square. This 2-dimensional set of CRCs is stored in server memory in a data structure defining the cached bitmap. The CRCs may be placed into a suitable hash table, so the search algorithm can lookup any 32-bit CRC and very quickly tell whether it has been seen before, and if so where it is in which bitmap.

Illustrated in FIG. 3B is another example of an image layout comprising an image 300 divided into multiple image sections. This illustration depicts an embodiment having four image sections 310, 311, 314 and 315 that overlap by a margin 321 greater than the notational grid size 331. In one embodiment, the image layout depicted in FIG. 3B is the result of the application of the encoding methods and processes described herein.

Referring now to FIG. 3B, and in more detail, in one embodiment the image 300 is divided into image sections according to a notional grid size 431, and into image sections that overlap by a given margin 421. The notional grid size 431 and corresponding overlap margin 421 may be selected in part to maximize the chances of finding a match for a particular image section in a database (Not Shown) containing the indexes for the overlapping image sections and the images stored in cache 214, 216. Setting a notational grid size 321 that is much larger in size than the overlap margin 321 can increase the chances of identifying a mach even when an image to be encoded contains image sections shifted from their original position in the previously stored image. Increasing the chances can include, in some embodiments, setting the encoding notional grid size 321 to a value that is relatively prime with respect to the storage algorithm's notional grid size 321.

In one embodiment, the image section size of the image layout of an image 300 stored in storage is the same as the image section size of the image layout of an encoded image 300. The difference between the two image layouts, in this embodiment, is the notational grid size and the overlap margin. Thus, in the encoded image 300, the overlap margin is much larger than the notational grid size. The notational grid size, in this embodiment, can be relatively prime with respect to a national grid size of a caching algorithm.

In one embodiment, the divided image 300 illustrated in FIG. 3B comprises many of the same characteristics of the divided image 300 illustrated in FIG. 3A in the sense that the image sections 310, 314, 311 and 315 can be any of the image sections described herein, and the image 300 can be any of the images described herein.

Figure 4A:
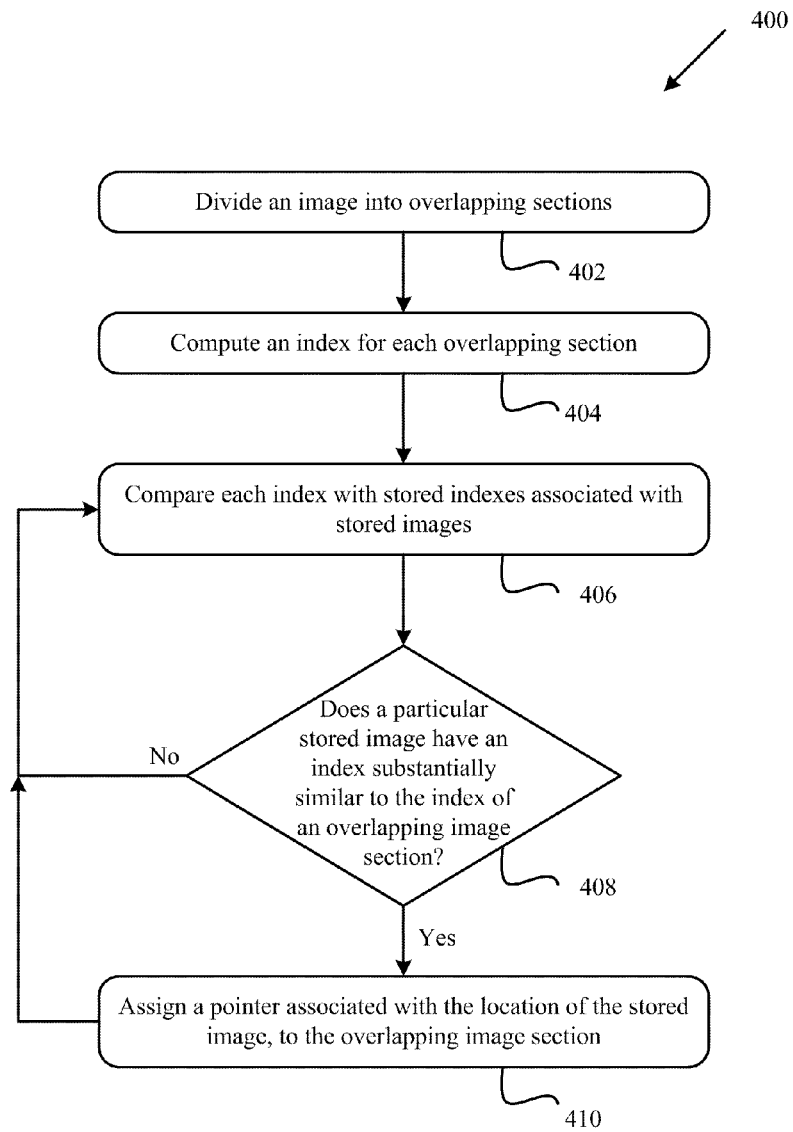
FIG. 4A depicts a flow diagram illustrating an embodiment of a method for encoding an image.

Illustrated in FIG. 4A is an embodiment of a method 400 for encoding an image. The method includes dividing an image into overlapping sections (Step 402), computing an index for each overlapping section (Step 404) and comparing each computed index with stored indexes associated with stored images (Step 406). Subsequent to the comparison, a determination is made as to whether a particular stored image has an index substantially similar to the index of an overlapping image section (Step 408). If such a stored image is located, then a pointer associated with the location of the stored image is assigned to the overlapping image section (Step 410). If such a stored image is not located, then the method 400 continues to compare each computed index with the stored indexes.

Further referring to FIG. 4A, and in more detail, in one embodiment the encoder 204 executing on the local computing machine 200 retrieves at least one image from the frame buffer 202 and divides that image into overlapping sections (Step 402) much in the same way as the image 300 illustrated in FIGS. 3A-B are divided into overlapping image sections. The encoder 204 can in some embodiments divide at least one image into overlapping image sections that each have a size dictated in part by a user, by the image size, or by any other method described herein. In one embodiment, the encoder 204 divides images by identifying the dimensions of an image, where the dimensions are measured in pixels. Once the image dimensions are determined, the encoder 204 can identify any pixel by its coordinates within the image. For example, in an image sized 1600 pixels by 1200 pixels, the upper-left most pixel can have a coordinate of (1, 1), while the pixel immediately to the right of that pixel has a coordinate of (1, 2) and the pixel immediately below that pixel has a coordinate of (2, 1). In this example, the coordinates are assigned according to the following standard, (row, column). Other embodiments can use any alternative standard such as (column, row) or any other coordinate system able to identify the location of pixels within an image. The encoder 204 can divide an image into overlapping sections by storing sets of pixel coordinates that define the boundaries of an image section, where each pixel coordinate set defines an image section that overlaps with another image section. For example, the image section defined by (1, 1), (1, 5), (5, 1), (5, 5), would overlap the image section defined by (1, 3), (1, 8), (5, 3), (5, 8). The overlap margin between these two image sections measures a width of two pixels and a length of 5 pixels. In some embodiments, the encoder 204 could store these sets of pixel coordinates in a storage repository located on the local computing machine 200.

Once the at least one image is divided into overlapping image sections, the encoder can compute an index for each overlapping image section (Step 404). The index can be any of the indexes described herein. In one embodiment, the index can be determined by computing a hash on the image sections, in another embodiment the index can be determined by computing a cyclic redundancy check or checksum on the image sections. Once an index is computed for each image section within the received or selected image, the indexes can in some embodiments be compared against a set of indexes stored in cache 214, 216. In other embodiments, once an index is computed for each image section, those indexes can be stored in cache 214, 216 or any other storage repository either on the local computing machine 200 or on another computing machine remote from the local computing machine 200. When the encoder 204 wishes to compare the indexes for each overlapping image section with the stored image indexes, the encoder 204 can in this embodiment retrieve the overlapping image section indexes from the storage repository before comparing them to the stored image indexes.

The encoder 204, in many embodiments, compares the indexes computed for each overlapping image section to indexes associated with stored images (Step 406). In one embodiment, a set of images that can in some embodiments correspond to the divided image, are stored in cache 214. These stored images can be in some embodiments entire images that are further sectioned into overlapping images much like the image 300 depicted in FIG. 3A is divided into overlapping images. In other embodiments, these stored images can be image sections stored in cache 214. In some embodiments the images stored in the cache 214 on the local computing machine 200 is substantially the same as the images stored in the cache 216 on the remote computing machine 201. In one embodiment, the encoder 204 can compute an index for each stored image, associate that computed index with each stored image and store the computed index in cache 214. In other embodiments, the index associated with each stored image is computed ahead of time by an encoder and stored together with the stored images.

The comparison of the indexes associated with the stored images and the indexes computed for each overlapping image can include determining whether the index values are substantially the same. In one embodiment, the comparison can result in a determination of a degree of similarity. When the degree of similarity is either above or below a particular threshold, a value is returned indicating that the two indexes are substantially the same. In another embodiments, the two indexes can be subtracted from one another and a value indicating that the two indexes are substantially the same can be sent when the result of the subtraction is zero.

In one embodiment, the encoder 204 retrieves the result of each comparison and determines whether the compared indexes are substantially the same (Step 480). When it is determined that the compared indexes are substantially the same, then the encoder 204 assigns to the overlapping image section a pointer indicating the storage location of the substantially similar image stored in cache 214, 216 (Step 410). Assigning the pointer can include inserting a record or updating a record in a table indicating that the section of the image 300 defined by the coordinates that define the overlapping image section are associated with a memory location in a cache 214, 216. This memory location can comprise a memory location in the cache 214 on the local computing machine 200 and can comprises a memory location in the cache 216 on the remote computing machine 201. In one embodiment, the cache 214 on the local computing machine 200 and the cache 216 on the remote computing machine 201 are substantially the same. The memory location, in one embodiment, is the memory location where the stored image is stored.

Either after a pointer is assigned to the overlapping image section (Step 410) or after a determination is made that the two compared indexes are not substantially similar (Step 408), then the method 400 goes back to Step 406 and continues comparing each computed index associated with a particular overlapping image section to each stored index associated with stored images.

In one embodiment, the encoder 204 can carry out most of the process 400. However in other embodiments, another module or client able to divide images into image sections and perform the other aspects of the method described in FIG. 4A can be used in lieu of the encoder 204.

Figure 4B:
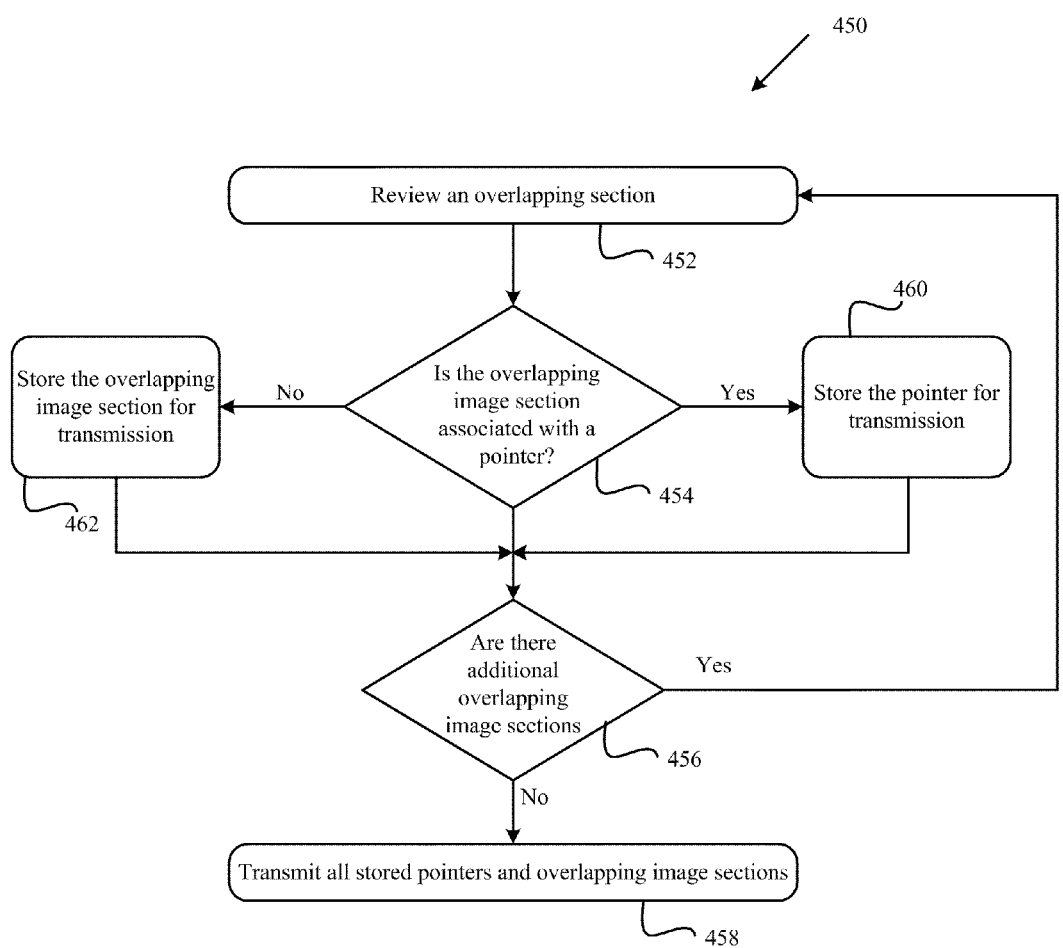
FIG. 4B depicts a flow diagram illustrating an embodiment of a method for decoding an encoded image.

Illustrated in FIG. 4B is an embodiment of a method 450 for transmitting an encoded image 300 to a remote computing machine. In one embodiment, an encoder 204 reviews each overlapping image section within an image 300 (Step 452) and determines whether a first overlapping image section is associated with a pointer (Step 454). If that overlapping image section is associated with a pointer, then the pointer is stored for transmission (Step 460), and if the overlapping image section is not associated with a pointer then the overlapping image section is stored for transmission (Step 462). Once a determination is made as to whether the overlapping image section is associated with a pointer, the encoder determines whether there exist additional overlapping image sections (Step 456). If there are additional overlapping image sections, then the process moves on to the next overlapping image section and reviews that overlapping image section (Step 452), if there are no additional overlapping image sections, then the stored pointers and stored image sections are transmitted to a second computing machine or the remote computing machine 201.

Referring to FIG. 4B, and in greater detail, in one embodiment after a particular overlapping image section is reviewed (Step 452), a determination is made as to whether that overlapping image section is associated with a pointer (Step 454). This determination can be made at substantially the same point in time as a pointer is assigned to a particular overlapping image section, i.e. Step 410 in FIG. 4A. In other embodiments, the determination can be made by retrieving information stored in a table in a storage repository on the local computing machine 200 that indicates the pointers assigned to each overlapping image section. In some embodiments, if an overlapping image section is associated with a pointer, then that overlapping image section's entry in the table can identify a pointer.

In some embodiments, the pointers and overlapping image sections are stored in a transmission buffer prior to transmission (Steps 460, 462), while in other embodiments the pointers and overlapping image sections are stored in cache. Still other embodiments include a method 450 where the pointers and the overlapping image sections are not stored, but rather transmitted one at a time in the order in which they are determined. In these embodiments, the delivery system 222 or the encoder 204 would transmit a pointer or overlapping image section substantially immediately after either the pointer or overlapping image section is determined and identified (Step 454).

In one embodiment, the pointers and the overlapping image sections can be transmitted to the remote computing machine 201 or a second computing machine by the application/desktop delivery system 222 and over the virtual channel 206. In other embodiments, the pointers and overlapping image sections can be transmitted to the remote computing machine 201 or to a second computing machine by the encoder 204 and over the virtual channel 206. Transmission over the virtual channel 206 can include transmitting pointers and image sections using a presentation level protocol. In some embodiments, the encoder 204 may apply a compression algorithm to the overlapping image sections prior to transmission. In another embodiment, any one of the encoder

204, an encryption client or other module executing on the local computing machine 200 can encrypt the overlapping image sections and the pointers prior to transmission by applying an encryption algorithm. In still other embodiments, the overlapping image sections that are transmitted to the second computing machine or remote computing machine 201 are those overlapping image sections not associated with a pointer. Thus, if either the overlapping image sections are not in the pointer table or if their entry does indicate a corresponding or associated pointer, then those overlapping image sections are transmitted as opposed to a pointer.

Figure 5:
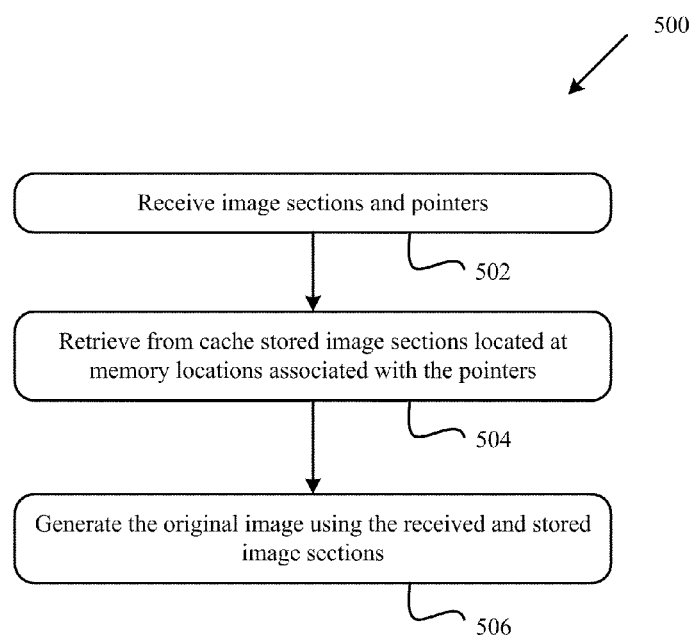

Illustrated in FIG. 5 is one embodiment of a method 500 for receiving encoded image sections and pointers. A decoder 208 on a second computing machine 201 or a remote computing machine 201 receives image sections and pointers from a first computing machine or local computing machine 200 (Step 502). The decoder 208 can then retrieve from a cache 216 on the remote computing machine 201 image sections that correspond to the received pointers (Step 504), and re-generate the original image using the received overlapping image sections and the retrieved stored image sections (Step 506).

Further referring to FIG. 5, and in more detail, in one embodiment the decoder 208 can receive the encoded image sections and pointers from the local computing machine 200. In other embodiments, the client agent 224 receives the encoded image sections and pointers and passes them along to the decoder 208. When the decoder 208 receives the encoded image sections and pointers, in some embodiments, the decoder 208 decompresses any compressed images. In still other embodiments, the decoder 208 can comprise a decryption algorithm such that when the decoder 208 receives encoded and encrypted image sections and pointers, the decoder 208 can decrypt the encrypted data prior to decoding the encoded image.

Once the decoder 208 receives the encoded image sections and the pointers, the decoder 208 can then process each pointer by retrieving from cache 216 stored image sections stored in a location corresponding to a processed pointer. Once the decoder 208 has retrieved all the stored images, the decoder 208 can then piece together the original image using the overlapping image sections and the retrieved stored image sections.

In one example, one or more stored images are divided into 16×16 pixel blocks overlapping by 1 pixel, in this example an encoding algorithm executed by the encoder 204 may divide the image 300 to be encoded into 16×16 pixel blocks overlapping by 12 pixels. A search algorithm executed by the encoder 204 can process the divided image 300 in a very similar manner to the algorithm used by the encoder 204 to divide the stored images in that it can used a grid and employ overlapping 16×16 pixel tiles. But the notional grid size in the encoding case is 4×4 not 16×16. So the vertical and horizontal grid-lines for this grid will intersect at bitmap coordinates: (0, 0) (0, 4) (4, 0) (4, 4) (8, 0) (8, 4) etc. . . . At the top-left coordinate of each 4×4 grid square, a 32-bit CRC is taken of a 16×16 pixel tile with the same top-left coordinate, i.e. a tile which extends 12 pixels past the right and the bottom edges of the grid square.

In this example the encoding algorithm will create approximately 14 times as many overlapping 16×16 tiles as in the storage case, which would therefore imply a very large and potentially prohibitive CPU cost for the CRCing. To prevent this, one may take advantage of the fact that each 16×16 tile consists of four 8×8 tiles, and each 8×8 tile consists of four 4×4 tiles. Therefore, one can start by taking the CRC of each 4×4 tile in the grid. A CRC can be taken of each possible 8×8 tile using the CRCs of its four constituent 4×4 tiles (4 bytes each), not the tile pixels themselves (16*3 bytes each). Similarly, the 16×16 tile are then calculated. CRCs using the CRCs of the 8×8 tiles as the input. Using this hierarchical system we CRC each raw pixel only once, with the higher levels then only adding a small load on top. If this optimizing of CRC calculation is used, depending on the properties of the CRC algorithm, the storage algorithm may also need to use the same CRC technique in order for matching tiles to have matching CRCs. That is, for any given 16×16 tile, it needs to calculate the CRCs of the sixteen 4×4 files, then use these to calculate the CRCs of the four 8×8 tiles, and then use these to calculate the CRC of the 16×16 tile. But again, this only adds a small extra cost.

A potential advantage of this detailed example is illustrated by the following scenario. Assume that one is processing a photograph that has actually been drawn before at some stage, but maybe in a different place and as part of a different sized bitmap, so that its 15×15 grid origin (that is, the placement of blocks) of the stored image is effectively arbitrary. However, as the encoding algorithm progressively searches for matches of 16×16 blocks, moving along 4 pixels at a time, it is likely that the encoding algorithm will discover at least some tiles that match exactly between these two photographs. To appreciate why this is so, imagine the new bitmap with its 4×4 grid lines, and then superimpose on this the 15×15 grid from the previously stored bitmap containing the photograph, with its arbitrary origin. Because the numbers 4 and 15 (the respective notional grid sizes) are relatively prime (no common factors) the vertical and horizontal lines from the two grids will periodically coincide. They will coincide, in fact, every 60 pixels (60=4*15), so that every 60×60 rectangle in the photograph will contain one tile that is exactly the same tile in both the storage and search data structures. This particular tile will provide a link or bridge between the new bitmap and that particular stored bitmap.

Once one matching block is found, the grid alignment of the stored image in relation to the new image may easily be determined by computing the difference in offsets of the matched block in the old and new image. A 15×15 grid can then be superimposed on the new photograph at the position of the matching block, and CRCs can be calculated of the tiles surrounding the matching tile. This technique can be sued to progressively extend the match area in all directions as far as any further 16×16 tile matches will allow. The search process then continues until we have found all matches with previous data in previous bitmaps, and the remaining unmatched data then goes through the storage algorithm, and then gets sent over as a new bitmap or bitmaps.

Note that by starting in the top left corner for the encoding algorithm, if the new bitmap is just a redraw of exactly a previous bitmap, a matching tile may be found immediately at coordinate (0, 0). In one embodiment, if only a single matching tile (the original one) is found, it may not be used in the encoding. The encoding algorithm may require any number of matching tiles including without limitation 2, 3, 4, 5, 6, 7, or more tiles. The minimum tile requirement may be based on considerations including the amount of time saved by incorporating a reference to a block as opposed to sending raw pixel data. The minimum tile requirement may also be based on the robustness of a CRC algorithm used. For example, if a CRC algorithm gives a X likelihood of a false match, requiring one more than one tile to match may be a way to reduce the likelihood of false positives, but without requiring a potentially time-intensive pixel-by-pixel comparison of matched blocks.

In some embodiments, processor overhead may be reduced by computing both a lightweight CRC and heavyweight CRC for each block in the storage case. The lightweight CRC may be selected as CRC that is faster to compute, but perhaps gives a higher false positive frequency than the heavyweight CRC. The blocks may then be stored along with their heavy weight CRC and in such that a way that they can be indexed by the lightweight CRC, The encoding algorithm may then first compute the lightweight CRC for each block to check for a match. If a match is found, a heavyweight CRC may be computed to confirm the match. In this manner, the number of heavyweight CRCs computed by the encoding algorithm may be reduced.

While certain exemplary embodiments have been described and shown in the accompanying drawings, it is to be understood that such embodiments are merely illustrative of and not restrictive on the broad invention, and that this invention not be limited to the specific constructions and arrangements shown and described. Additionally, it is possible to implement the invention or some of its features in hardware, programmable devices, firmware, software or a combination thereof. The invention or parts of the invention may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for enhanced image encoding, the method comprising:
   dividing, by an encoder executing on a computing machine, an image into at least two overlapping image sections according to a grid size and an overlap margin;
   computing, by the encoder, a lightweight index for each overlapping image section;
   comparing, by the encoder, the lightweight index for each overlapping image section to lightweight indexes associated with stored image blocks;
   identifying, by the encoder responsive to the comparison of lightweight indexes, a first match between at least one stored image block having a first lightweight index substantially similar to a first lightweight index computed for the at least one overlapping image section;
   computing, by the encoder, in response to the first match, a first heavyweight index for the at least one overlapping section;
   comparing, by the encoder, the first heavyweight index with a second heavyweight index associated with the at least one stored image block;
   confirming, by the encoder responsive to the comparison of heavyweight indexes, the first match;
   assigning, by the encoder to the at least one overlapping image section, in response to the confirming, a pointer to a storage location of the at least one stored image block; and
   transmitting the pointer and overlapping image sections not assigned to the pointer to a second computing machine.

2. The method of claim 1, wherein dividing according to the overlap margin further comprises dividing according to an overlap margin having a measurement of at least one pixel.

3. The method of claim 1, wherein dividing according to the overlap margin further comprises dividing according to an overlap margin having a measurement of at least a portion of the image.

4. The method of claim 1, wherein each image section overlaps according to the overlap margin.

5. The method of claim 1, wherein the stored image blocks are stored in a storage repository on the computing machine.

6. The method of claim 5, wherein the storage repository is a cache.

7. The method of claim 5, wherein dividing according to the grid size further comprises dividing according to a grid size dictated by either one of the storage repository and the encoder.

8. The method of claim 1, wherein transmitting the pointer further comprises transmitting the pointer, and not transmitting the at least one overlapping image section assigned to the pointer.

9. The method of claim 1, wherein
   the lightweight index can be either one of a cyclic redundancy check, a hierarchical cyclic redundancy check, and a hash value;
   the heavyweight index can be either one of a cyclic redundancy check, a hierarchical cyclic redundancy check, and a hash value; and
   the computation of the lightweight index is more time efficient than the computation of the heavyweight index.

10. The method of claim 5, wherein the pointer further comprises a memory location in the storage repository corresponding to the at least one stored image block associated with the pointer.

11. A system for enhanced image encoding, the system comprising:
    a first computing machine executing an application that produces at least one image, and storing in a storage repository on the first computing machine image blocks;
    a second computing machine communicating with the first computing machine over a communication channel and via a presentation level protocol; and
    an encoder executing on the first computing machine, the encoder:
       dividing the at least one image into at least two overlapping image sections according to a grid size and an overlap margin,
       computing a lightweight index for at least one overlapping image section,
       comparing the lightweight index for each overlapping image section to lightweight indexes associated with the stored image blocks,
       identifying, responsive to the comparison of lightweight indexes, a first match between at least one stored image block having a lightweight index substantially similar to a first lightweight index computed for the at least one overlapping image section;
       computing, in response to the first match, a first heavyweight index for the at least one overlapping section;
       comparing the first heavyweight index with a second heavyweight index associated with the at least one stored image block;
       confirming, responsive to the comparison of heavyweight indexes, the first match;
       assigning to the at least one overlapping image section, in response to the confirming, a pointer to a storage location of the at least one stored image block, and
       transmitting, to the second computing machine, the pointer and not the associated overlapping image section.

12. The system of claim 11, wherein the encoder divides the at least one image according to an overlap margin having a measurement of at least one pixel.

13. The system of claim 11, wherein the encoder divides the at least one image according to an overlap margin having a measurement of at least a portion of the image.

14. The system of claim 11, wherein each overlapping image section overlaps according to the overlap margin.

15. The system of claim 11, wherein the storage repository is a cache.

16. The system of claim 11, wherein the encoder divides the at least one image according to a grid size dictated by the encoder.

17. The system of claim 11, wherein the encoder divides the at least one image according to a grid size dictated by the storage repository.

18. The system of claim 11, wherein the encoder does not transmit the at least one overlapping image section assigned to the pointer.

19. The system of claim 11, wherein
the lightweight index can be either one of a cyclic redundancy check, a hierarchical cyclic redundancy check, and a hash value;
the heavyweight index can be either one of a cyclic redundancy check, a hierarchical cyclic redundancy check, and a hash value; and
the computation of the lightweight index is more time efficient than the computation of the heavyweight index.

20. The system of claim 11, wherein the pointer further comprises a memory location in the storage repository corresponding to the at least one stored image block associated with the pointer.

* * * * *